US009926998B2

(12) United States Patent
Kanda et al.

(10) Patent No.: US 9,926,998 B2
(45) Date of Patent: *Mar. 27, 2018

(54) PISTON STRUCTURE FOR ENGINE

(71) Applicant: MAZDA MOTOR CORPORATION, Hiroshima (JP)

(72) Inventors: Yasunori Kanda, Hiroshima (JP); Tsunehiro Mori, Aki-gun (JP); Yasuhiro Sudou, Iwakuni (JP); Masakazu Kikuchi, Hiroshima (JP); Kazuo Toyoda, Hiroshima (JP); Tetsuya Hanzawa, Higashihiroshima (JP); Yukiyoshi Fukuda, Hiroshima (JP); Akira Sumitani, Higashihiroshima (JP); Masahiro Koizumi, Hiroshima (JP); Koichi Hirata, Hiroshima (JP); Shuji Takuma, Hiroshima (JP); Kouji Kubo, Hiroshima (JP); Kazuya Nishimori, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 421 days.

This patent is subject to a terminal disclaimer.

(21) Appl. No.: 14/421,420

(22) PCT Filed: Aug. 9, 2013

(86) PCT No.: PCT/JP2013/004814
§ 371 (c)(1),
(2) Date: Feb. 12, 2015

(87) PCT Pub. No.: WO2014/034034
PCT Pub. Date: Mar. 6, 2014

(65) Prior Publication Data
US 2015/0219181 A1    Aug. 6, 2015

(30) Foreign Application Priority Data
Aug. 29, 2012    (JP) ................. 2012-189134

(51) Int. Cl.
*F16J 1/16*    (2006.01)
*F16F 15/04*    (2006.01)
(Continued)

(52) U.S. Cl.
CPC ............... *F16F 15/04* (2013.01); *F02F 3/00* (2013.01); *F16C 9/04* (2013.01); *F16C 27/02* (2013.01); *F16F 7/104* (2013.01); *F16J 1/16* (2013.01)

(58) Field of Classification Search
CPC ....... F16J 1/16; F16J 1/14; F16F 15/04; F16C 9/04; F16C 27/02; F16C 27/04
(Continued)

(56) References Cited

U.S. PATENT DOCUMENTS

2015/0075478 A1*    3/2015    Hirata ............... F02F 3/0069
123/193.6

FOREIGN PATENT DOCUMENTS

CN        2683932 Y    3/2005
CN      201074653 Y    6/2008
(Continued)

OTHER PUBLICATIONS

International Search Report; PCT/JP2013/004814; dated Sep. 10, 2013.
(Continued)

*Primary Examiner* — F. Daniel Lopez
*Assistant Examiner* — Daniel Collins
(74) *Attorney, Agent, or Firm* — Studebaker & Brackett PC

(57) ABSTRACT

An engine piston structure includes: a piston (1); a connecting rod (10) having a small end part (10a) coupled to the piston (1), and having a large end part (10b) coupled to a crankshaft; a piston pin (2) through which the piston (1) and the small end part (10a) of the connecting rod (10) are
(Continued)

coupled together and which has a hollow cross section; and at least one dynamic vibration absorber (20) provided inside the piston pin (2) to reduce resonance of the piston (1), the piston pin (2), and the small end part (10*a*) of the connecting rod (10) in combination with respect to the large end part (10*b*) of the connecting rod (10) during a combustion stroke.

3 Claims, 15 Drawing Sheets

(51) Int. Cl.
*F02F 3/00* (2006.01)
*F16C 9/04* (2006.01)
*F16C 27/02* (2006.01)
*F16F 7/104* (2006.01)

(58) Field of Classification Search
USPC .................................................. 92/172, 187
See application file for complete search history.

(56) References Cited

FOREIGN PATENT DOCUMENTS

| EP | 2022961 A2 | 2/2009 |
| GB | 239203 A | 2/1926 |
| JP | S59-181248 U | 12/1984 |
| JP | S60-154663 U | 10/1985 |
| JP | S62-163365 U | 10/1987 |
| JP | H07-54996 A | 2/1995 |
| JP | 2004-353500 A | 12/2004 |
| RU | 2182244 C2 | 5/2002 |

OTHER PUBLICATIONS

Otsuka, M.; "How to minimize diesel combustion noise by improving engine structure"; Congress Proceedings of the Society of Automotive Engineers of Japan; No. 36-05; pp. 7-10.

Notification of Transmittal of Translation of the International Preliminary Report on Patentability; PCT/JP2013/004814; dated Mar. 5, 2015.

* cited by examiner

PISTON STRUCTURE FOR ENGINE

TECHNICAL FIELD

The present invention relates to an engine piston structure in which a piston and a small end part of a connecting rod are coupled together through a piston pin.

BACKGROUND ART

Typically, an engine of a vehicle, such as an automobile, includes a piston, and a connecting rod having a small end part coupled to the piston through a piston pin. Specifically, the piston pin is inserted through a pin insertion hole in the small end part of the connecting rod, and the small end part of the connecting rod is located on a middle portion of the piston pin in a direction along the central axis of the piston pin. Both end portions of the back face of the piston (opposite to the top face thereof) in the direction along the central axis of the piston pin form two boss portions between which the small end part of the connecting rod is interposed. The two boss portions each have a pin support hole into which both end portions of the piston pin in the direction along the central axis of the piston pin are inserted to support the end portions (see, for example, Patent Document 1).

In the engine, resonance determined by the principal structure of the engine has been known to cause combustion noise (see, for example, Non-Patent Document 1). Non-Patent Document 1 shows that engine sound has three peak frequencies of 1.7 kHz, 3.3 kHz, and 6 kHz, one of the peak frequencies (3.3 kHz) results from resonance caused by the extension and contraction of the connecting rod, and the resonance can hardly decrease in amplitude.

CITATION LIST

Patent Document

PATENT DOCUMENT 1: Japanese Unexamined Patent Publication No. 2004-353500

Non-Patent Document

NON-PATENT DOCUMENT 1: Masaya Otsuka; Method of Reducing Diesel Combustion Noise With Engine Structure, Proceedings of Society of Automotive Engineers of Japan No. 36-05, Society of Automotive Engineers of Japan, May 2005, pp. 7-10

SUMMARY OF THE INVENTION

Technical Problem

The inventors of this application have intensively studied a spring mass model of an assembly of a piston and a connecting rod, and consequently have found the following.

In the spring mass model of the assembly of the piston and the connecting rod, the piston, a piston pin, and a small end part of the connecting rod collectively correspond to a material particle (having a mass of M in units of kg), and a coupling part of the connecting rod coupling the small end part thereof and a large end part thereof together corresponds to a spring that supports the material particle with respect to the large end part (and has a spring constant of K in units of N/m). Thus, if the piston, the piston pin, and the small end part of the connecting rod are connected together, they collectively resonate with respect to the large end part of the connecting rod at a resonant frequency of $(1/2\pi) \cdot (K/M)^{1/2}$ Hz (e.g., 3-4 kHz). The resonance corresponds to the resonance caused by the extension and contraction of the connecting rod in Non-Patent Document 1.

A lubricating oil film is formed between the piston pin and the inner surface of a pin insertion hole of the connecting rod. The lubricating oil film corresponds to a spring that couples the piston pin and the small end part of the connecting rod together. When a full floating piston pin, which is rotatable with respect to boss portions of the piston and the small end part of the connecting rod, is used, not only the lubricating oil film is formed between the piston pin and the inner surface of the pin insertion hole of the connecting rod, but also another lubricating oil film is formed between the piston pin and the inner surface of a pin support hole of each boss portion of the piston. The another lubricating oil film corresponds to a spring that couples the piston pin and the piston together.

The lubricating oil film between the piston pin and the inner surface of the pin insertion hole of the connecting rod (in the case of the full floating piston pin, the lubricating oil film and the another lubricating oil film between the piston pin and the inner surface of the pin support hole of each boss portion of the piston) allows the piston to be supported with respect to the small end part of the connecting rod through the corresponding spring, and prevents the piston, the piston pin, and the small end part of the connecting rod from collectively resonating with respect to the large end part of the connecting rod. During strokes except a combustion stroke (expansion stroke), the piston is not pressed under high pressure, and the lubricating oil film thus remains to prevent the resonance.

By contrast, during the combustion stroke, the piston is pressed under high pressure, and the lubricating oil film is thus eliminated. Consequently, the piston, the piston pin, and the small end part of the connecting rod collectively resonate with respect to the large end part of the connecting rod.

In view of the foregoing, since, during the combustion stroke, the piston, the piston pin, and the small end part of the connecting rod are connected together, a dynamic vibration absorber may be utilized to reduce the resonance of the piston, the piston pin, and the small end part of the connecting rod (to reduce vibrations at a resonant frequency). Unfortunately, the provision of the dynamic vibration absorber can merely reduce the noise arising from the resonance during the combustion stroke, and increases noise due to vibrations of the dynamic vibration absorber during the other strokes during which the piston, the piston pin, and the small end part of the connecting rod are not connected together.

It is an object of the present invention to reduce the resonance of a piston, a piston pin, and a small end part of a connecting rod in combination with respect to a large end part of the connecting rod during a combustion stroke and to reduce the increase in noise during the other strokes.

Solution to the Problem

To achieve the object, an engine piston structure according to the present invention includes: a piston configured to reciprocate in a cylinder; a connecting rod having a small end part coupled to the piston, and having a large end part coupled to a crankshaft; a piston pin through which the piston and the small end part of the connecting rod are coupled together and which has a hollow cross section; and at least one dynamic vibration absorber provided inside the piston pin to reduce resonance of the piston, the piston pin, and the small end part of the connecting rod in combination with respect to the large end part of the connecting rod during a combustion stroke.

This configuration allows the dynamic vibration absorber to reduce resonance of the piston, the piston pin, and the small end part of the connecting rod in combination when, during the combustion stroke, a lubricating oil film between the piston pin and the connecting rod (in the case where the piston is a full floating piston, the lubricating oil film and another lubricating oil film between the piston pin and the piston) is eliminated so that the piston, the piston pin, and the small end part of the connecting rod are connected together. If the lubricating oil film exists between the piston pin and the connecting rod, i.e., during an intake stroke, a compression stroke, and an exhaust stroke, the provision of the dynamic vibration absorber inside the piston pin allows the lubricating oil film (spring) to prevent vibrations of the dynamic vibration absorber from being transferred to the connecting rod, and prevents the vibrations from increasing noise. The provision of the dynamic vibration absorber inside the piston pin enables effective utilization of a space, and eliminates the need for increasing the size of the piston.

In the engine piston structure, the at least one dynamic vibration absorber preferably comprises two dynamic vibration absorbers provided inside the piston pin, each dynamic vibration absorber preferably has a fixed portion fixed to the piston pin, a movable portion extending inside the piston pin in a direction along a central axis of the piston pin, and a supporting portion supporting the movable portion such that the movable portion is capable of vibrating with respect to the fixed portion along a diameter of the piston pin, and the two dynamic vibration absorbers are preferably located at both sides of a plane that passes through a middle of the piston pin in the direction along the central axis of the piston pin and is perpendicular to the central axis of the piston pin.

This enables simple configuration of the dynamic vibration absorber and easy provision of the dynamic vibration absorber inside the piston pin. Since the two dynamic vibration absorbers are located at both sides of the plane that passes through the middle of the piston pin in the direction along the central axis thereof and is perpendicular to the central axis of the piston pin, the weights of portions of the piston located at both sides of the plane (i.e., portions of the piston located at both sides of the small end part of the connecting rod in the direction along the central axis of the piston pin) can be easily equalized.

When the two dynamic vibration absorbers are provided inside the piston pin, it is preferable that masses of the movable portions of the two dynamic vibration absorbers are substantially equal to each other, and that the two dynamic vibration absorbers have different spring constants.

This can reduce vibrations in a relatively wide frequency range including the resonant frequency while enabling equalization of the weights of portions of the piston located at both sides of the plane that passes through the middle of the piston pin in the direction along the central axis thereof and is perpendicular to the central axis of the piston pin (i.e., portions of the piston located at both sides of the small end part of the connecting rod in the direction along the central axis of the piston pin). Here, since the dynamic vibration absorbers are provided inside the piston pin, the mass of the movable portion of each dynamic vibration absorber cannot significantly increase. Thus, the resonance may be inadequately reduced under the influence of manufacturing errors in the dynamic vibration absorbers. However, if the two dynamic vibration absorbers are configured to have different spring constants, vibrations can be reduced in a relatively wide frequency range including the resonant frequency. Thus, if manufacturing errors in the dynamic vibration absorbers arise, the resonance could be adequately reduced.

Advantages of the Invention

As described above, according to the engine piston structure of the present invention, the provision of the dynamic vibration absorber inside the piston pin can reduce the resonance of the piston, the piston pin, and the small end part of the connecting rod in combination with respect to the large end part of the connecting rod during the combustion stroke, can reduce noise arising from the resonance, and can reduce an increase in noise arising from vibrations of the dynamic vibration absorber during the other strokes.

DESCRIPTION OF EMBODIMENTS

An embodiment of the present invention will now be described in detail with reference to the drawings.

Figure 1:
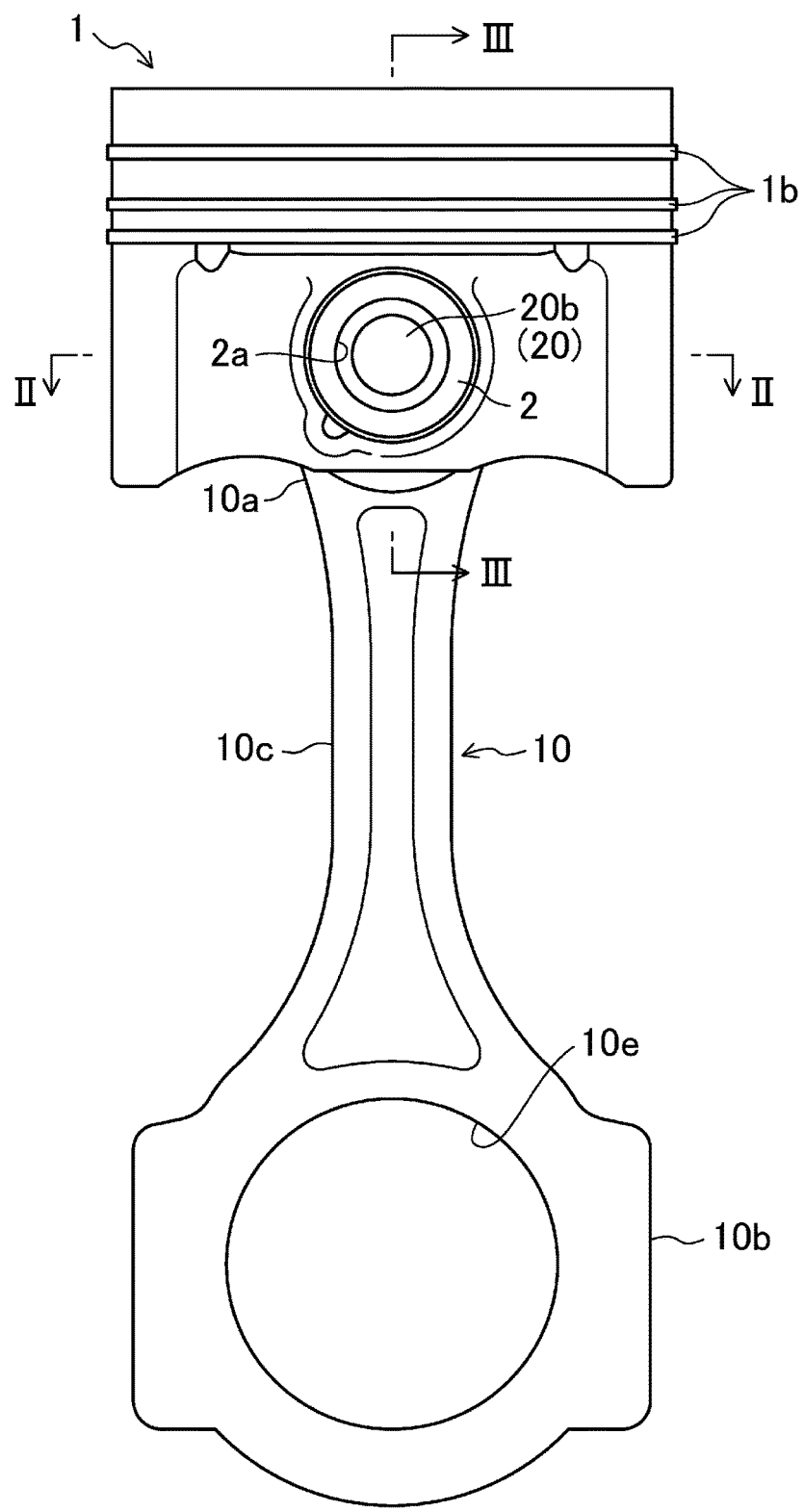
FIG. 1 illustrates a piston and a connecting rod of an engine in which a piston structure according to an embodiment of the present invention is used.
Figure 2:
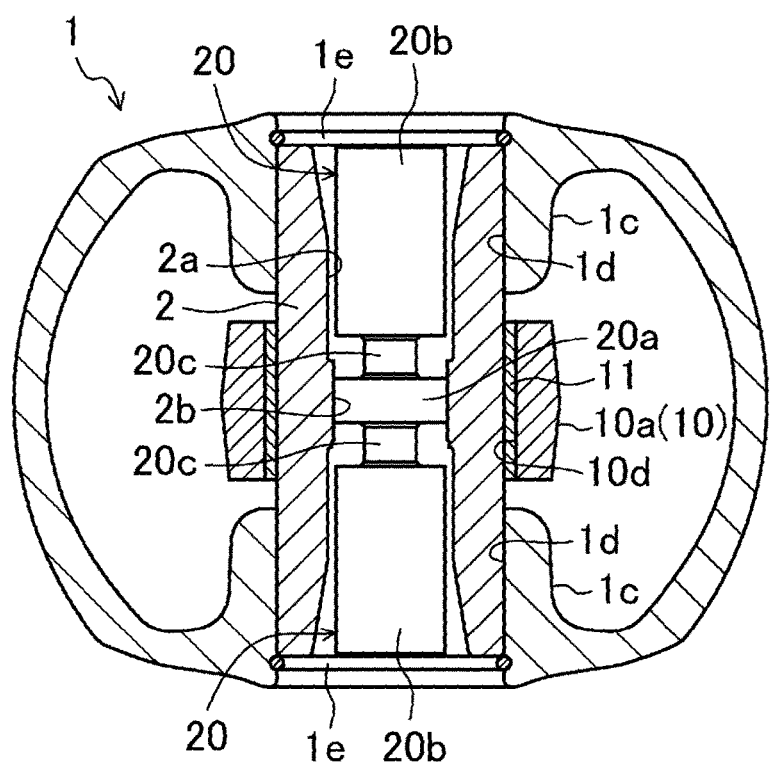
FIG. 2 is a cross-sectional view taken along the line II-II in FIG. 1.
Figure 3:
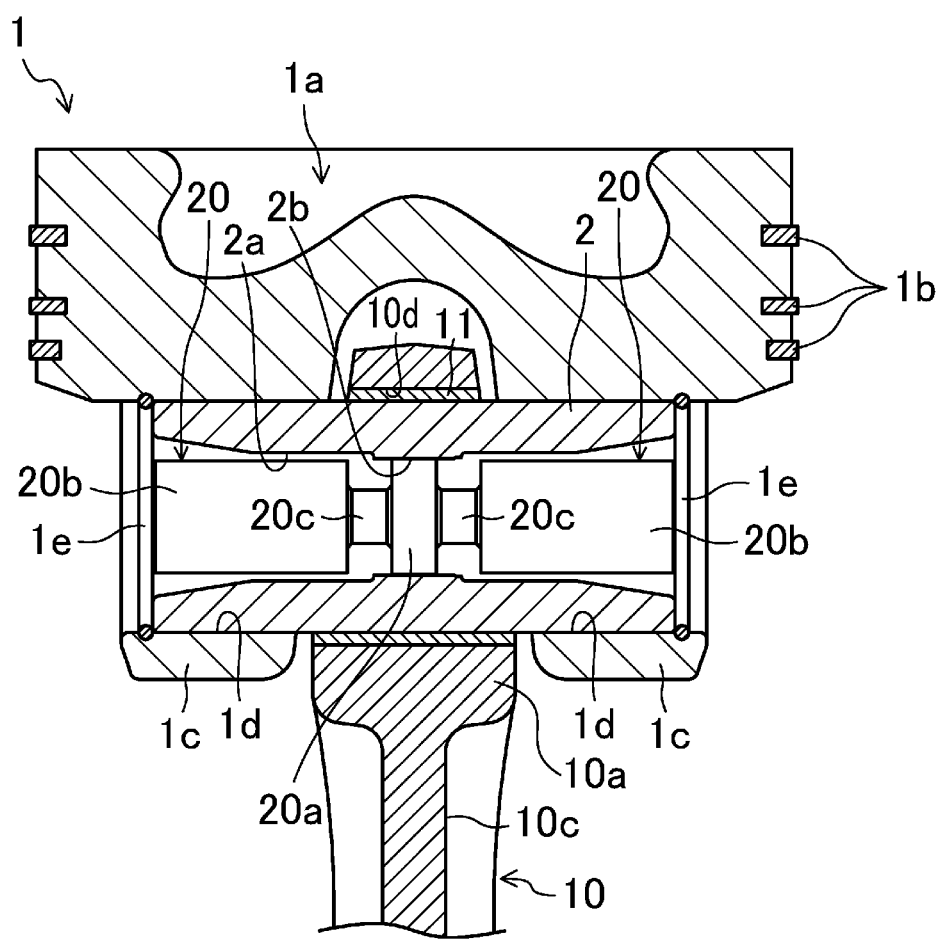
FIG. 3 is a cross-sectional view taken along the line III-III in FIG. 1.

FIGS. 1-3 illustrate a piston 1 and a connecting rod 10 of an engine in which a piston structure according to the embodiment of the present invention is used. The piston 1 repeats a cylinder cycle (an intake stroke, a compression stroke, a combustion stroke, i.e., an expansion stroke, and an exhaust stroke) to reciprocate in a cylinder along the cylinder axis (upwardly and downwardly in FIGS. 1 and 3).

The piston 1 is coupled to one end part of the connecting rod 10, i.e., a small end part 10a thereof, through a piston pin 2. The other end part of the connecting rod 10, i.e., a large end part 10b thereof, is coupled to an unshown crankshaft. The small end part 10a and the large end part 10b of the connecting rod 10 are coupled together through a coupling part 10c thereof. The reciprocation of the piston 1 is transferred through the connecting rod 10 to the crankshaft to rotate the crankshaft. The central axis of the piston pin 2 extends in the same direction as the axis of the crankshaft (in a lateral direction in FIG. 3).

The small end part 10a of the connecting rod 10 has a pin insertion hole 10d through which the piston pin 2 is inserted. The large end part 10b of the connecting rod 10 has a shaft insertion hole 10e through which the crankshaft is inserted.

Although not shown in FIG. 1, the large end part 10b of the connecting rod 10 is divided into two sections by the center line of the shaft insertion hole 10e in a longitudinal direction of the coupling part 10c.

The piston pin 2 is inserted through the pin insertion hole 10d in the small end part 10a of the connecting rod 10, and the small end part 10a of the connecting rod 10 is located on a middle portion of the piston pin 2 in a direction along the central axis thereof. The small end part 10a of the connecting rod 10 is located in the middle of the piston 1 in the direction along the central axis of the piston pin 2.

The piston pin 2 is rotatably inserted through the pin insertion hole 10d of the connecting rod 10. A bushing 11 is fixed to the inner surface of the pin insertion hole 10d of the connecting rod 10. Strictly speaking, the piston pin 2 is rotatably inserted through the bushing 11.

A space between the piston pin 2 and the inner surface of the pin insertion hole 10d of the connecting rod 10 (strictly speaking, the bushing 11) is supplied with lubricating oil circulating in the engine to form a lubricating oil film. The lubricating oil film and the bushing 11 allow the piston pin 2 to smoothly rotate with respect to the pin insertion hole 10d of the connecting rod 10.

The top face of the piston 1 has a cavity 1a. Circular piston rings 1b are fitted to the outer circumferential surface of the piston 1 above the piston pin 2.

Both end portions of the back face of the piston 1 (opposite to the top face) in the direction along the central axis of the piston pin 2 each have a boss portion 1c. The two boss portions 1c protrude toward the crankshaft such that the small end part 10a of the connecting rod 10 is interposed between the boss portions 1c. The two boss portions 1c each have a pin support hole 1d extending along the central axis of the piston pin 2. Both end portions of the piston pin 2 in the direction along the central axis thereof are each inserted into the pin support hole 1d of the corresponding one of the two boss portions 1c, and are thus supported.

In this embodiment, a full floating piston pin is used as the piston pin 2. Specifically, the piston pin 2 is rotatable with respect to the pin insertion hole 10d of the connecting rod 10, and is rotatable also with respect to the pin support hole 1d of each boss portion 1c of the piston 1.

A lubricating oil film is formed between the piston pin 2 and the inner surface of the pin insertion hole 10d of the connecting rod 10, and another lubricating oil film is also formed between the piston pin 2 and the inner surface of the pin support hole 1d of each boss portion 1c of the piston 1. The another lubricating oil film allows the piston pin 2 to smoothly rotate with respect to the pin support hole 1d of each boss portion 1c of the piston 1.

Two snap rings 1e are each inserted into an end portion of the pin support hole 1d of the corresponding one of the two boss portions 1c toward the outer circumferential surface of the piston 1, and are fixed. The two snap rings 1e are each in contact with the corresponding one of both end surfaces of the piston pin 2 in the direction along the central axis of the piston pin 2 to regulate the movement of the piston pin 2 along the central axis of the piston pin 2.

The piston pin 2 has a hollow cross section, and its central portion has a through hole 2a extending along the central axis of the piston pin 2. A middle portion of the inner surface of the through hole 2a in the direction along the central axis of the piston pin 2 is provided with a press-fit portion 2b into which fixed portions 20a of dynamic vibration absorbers 20 described below are press-fitted. The inside diameter of the press-fit portion 2b of the inner surface of the through hole 2a is smaller than that of another portion of the inner surface of the through hole 2a.

The piston pin 2 includes therein (in the through hole 2a) two dynamic vibration absorbers 20, which reduce the resonance of the piston 1, the piston pin 2, and the small end part 10a of the connecting rod 10 in combination with respect to the large end part 10a of the connecting rod 10 during a combustion stroke. The two dynamic vibration absorbers 20 are located at both sides of a plane that passes through the middle of the piston pin 2 in the direction along the central axis of the piston pin 2 and is perpendicular to the central axis of the piston pin 2.

Figure 4:
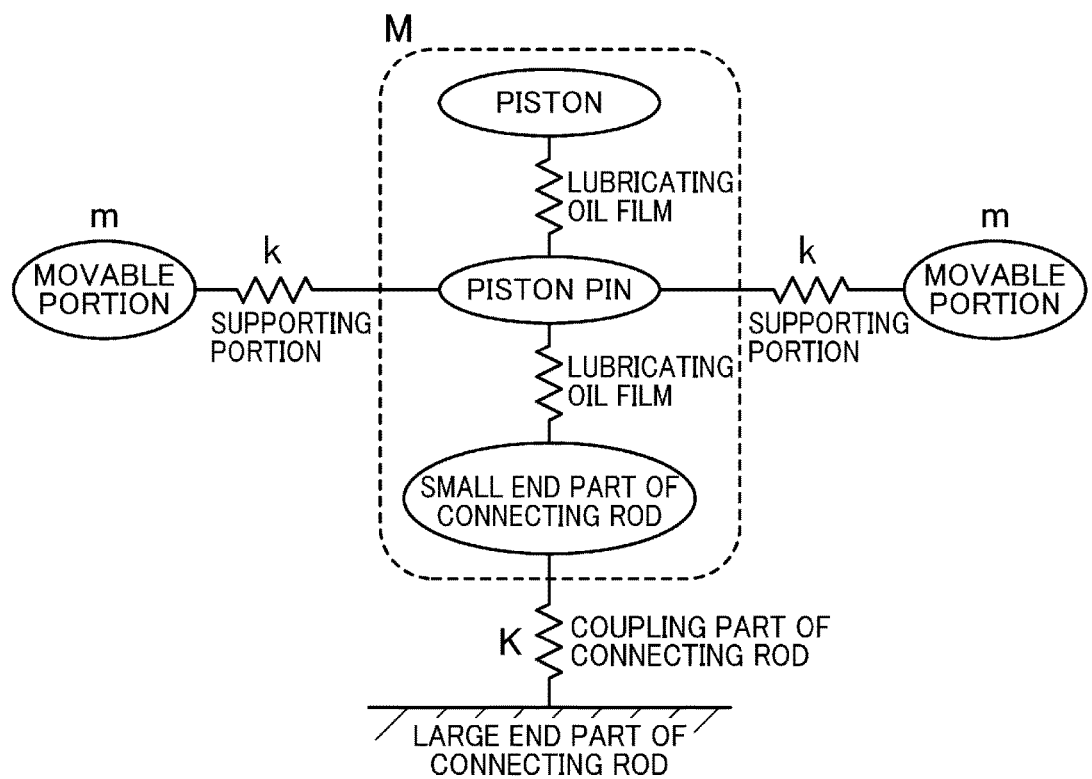
FIG. 4 illustrates a spring mass model of an assembly of the piston and the connecting rod.

Here, the spring mass model of an assembly of the piston 1 and the connecting rod 10 is shown in FIG. 4. Specifically, the piston 1, the piston pin 2, and the small end part 10a of the connecting rod 2 collectively correspond to a material particle (having a mass of M in units of kg), and the coupling part 10c of the connecting rod 10 corresponds to a spring that supports the material particle with respect to the large end part 10b of the connecting rod 10 (and has a spring constant of K in units of N/m).

The lubricating oil film between the piston pin 2 and the inner surface of the pin insertion hole 10d of the connecting rod 10 corresponds to a spring that couples the piston pin 2 and the small end part 10a of the connecting rod 10 together. The lubricating oil film between the piston pin 2 and the inner surface of the pin support hole 1d of each boss portion 1c of the piston 1 corresponds to a spring that couples the piston pin 2 and the piston 1 (each boss portion 1c) together.

During the combustion stroke, the piston 1 is pressed under high pressure. This eliminates both the lubricating oil film between the piston pin 2 and the inner surface of the pin insertion hole 10d of the connecting rod 10 (the spring that couples the piston pin 2 and the small end part 10a of the connecting rod 10 together) and the lubricating oil film between the piston pin 2 and the inner surface of the pin support hole 1d of each boss portion 1c of the piston 1 (the spring that couples the piston pin 2 and the piston 1 together). As a result, the piston 1, the piston pin 2, and the small end part 10a of the connecting rod 10 are connected together. This allows the piston 1, the piston pin 2, and the small end part 10a of the connecting rod 10 to collectively resonate with respect to the large end part 10b of the connecting rod 10 at a resonant frequency of $(1/2\pi)\cdot(K/M)^{1/2}$ Hz.

To reduce the resonance (to reduce vibrations at the resonant frequency), the two dynamic vibration absorbers 20 are provided inside the piston pin 2 (in the through hole 2a). As illustrated in FIGS. 2 and 3, each dynamic vibration absorber 20 has the fixed portion 20a, a movable portion 20b, and a supporting portion 20c. The fixed portion 20a is fixed by being press-fitted into the press-fit portion 2b of the inner surface of the through hole 2a of the piston pin 2. The movable portion 20b extends along the central axis of the piston pin 2 inside the piston pin 2. The supporting portion 20c supports the movable portion 20b with respect to the fixed portion 20a such that the movable portion 20b can vibrate along the diameter of the piston pin 2.

In this embodiment, the fixed portion 20a, the movable portion 20b, and the supporting portion 20c of each dynamic vibration absorber 20 are formed in one piece, and are made of metal. The fixed portions 20a of the two dynamic vibration absorbers 20 are also formed in one piece, and the fixed portions 20a form a substantially single member. The integral fixed portions 20a of the two dynamic vibration absorbers 20 are press-fitted into the press-fit portion 2b so as to be fixed. The movable portion 20b of one of the dynamic vibration absorbers 20 is provided on one of surfaces of the integral fixed portions 20a in the direction along the central axis of the piston pin 2 with the corresponding supporting portion 20c interposed therebetween. The movable portion 20b of the other one of the dynamic vibration absorbers 20 is provided on one of surfaces of the integral fixed portions 20a in the direction along the central axis of the piston pin 2 with the corresponding supporting portion 20c interposed therebetween.

The movable portion 20b of each dynamic vibration absorber 20 forms a cylindrical shape, and extends along the central axis of the piston pin 2. The outside diameter of the movable portion 20b is determined such that if the movable portion 20b vibrates, the movable portion 20b would not be in contact with the inner circumferential surface of the piston pin 2. The supporting portion 20c of each dynamic vibration absorber 20 forms a cylindrical shape to couple the movable portion 20b and the fixed portion 20a of each dynamic vibration absorber 20 together. The supporting portion 20c has a smaller outside diameter than the movable portion 20b, and supports the movable portion 20b with respect to the fixed portion 20a so as to be capable of vibrating along the diameter of the piston pin 2. The fixed portions 20a, the movable portions 20b, and the supporting portions 20c of the two dynamic vibration absorbers 20 are concentric with the piston pin 2. The movable portions 20b of the two dynamic vibration absorbers 20 have substantially the same mass. The centers of gravity of the movable portions 20b of the two dynamic vibration absorbers 20 are on the central axis of the piston pin 2, and are symmetrically located with respect to the plane that passes through the middle of the piston pin 2 in the direction along the central axis thereof and is perpendicular to the central axis of the piston pin 2.

The supporting portion 20c of each dynamic vibration absorber 20 corresponds to a spring that supports the movable portion 20b (having a mass of m in units of kg). To reduce the resonance, the value k/m, where k represents the spring constant of the movable portion 20b (in units of N/m), needs to be substantially equal to the value K/M. To obtain such a value k/m, the length and diameter of the movable portion 20b and the length and diameter of the supporting portion 20c are determined Strictly speaking, the mass of the supporting portion 20c needs to be considered. However, the mass of the supporting portion 20c is much lower than that of the movable portion 20b, and is, therefore, ignorable. If vibrations at frequencies except the resonant frequency may be strong, the value k/m does not need to be substantially equal to the value K/M.

The movable portions 20b of the two dynamic vibration absorbers 20 preferably have substantially the same mass, and the two dynamic vibration absorbers 20 (the supporting portions 20c) are preferably configured to have different spring constants. The reason for this is that not only vibrations at the resonant frequency, but also vibrations in a relatively wide frequency range including the resonant frequency can be reduced. To allow the two dynamic vibration absorbers 20 to have different spring constants, the supporting portions 20c of the two dynamic vibration absorbers 20 may be configured to have different lengths or diameters. Alternatively, the supporting portions 20c of the two dynamic vibration absorbers 20 may be configured to have different lengths and different diameters. Alternatively, the supporting portions 20c of the two dynamic vibration absorbers 20 may be made of different materials. The two dynamic vibration absorbers 20 may have substantially the same spring constant.

If the two dynamic vibration absorbers 20 are configured to have different spring constants, the spring constant of one of the dynamic vibration absorbers 20 is determined such that the value k/m is substantially equal to the value K/M, and the spring constant of the other one of the dynamic vibration absorbers 20 is determined to be greater or less than the spring constant of the one of the dynamic vibration absorbers 20.

As described above, during the combustion stroke, the lubricating oil film between the piston pin 2 and the inner surface of the pin insertion hole 10d of the connecting rod 10 (the spring through which the piston pin 2 and the small end part 10a of the connecting rod 10 are coupled together) and the lubricating oil film between the piston pin 2 and the inner surface of the pin support hole 1d of each boss portion 1c of the piston 1 (the spring through which the piston pin 2 and the piston 1 are coupled together) are both eliminated. As a result, the piston 1, the piston pin 2, and the small end part 10d of the connecting rod 10 collectively resonate with respect to the large end part 10b. However, in this embodiment, the dynamic vibration absorbers 20 in the piston pin 2 reduce the resonance, resulting in a reduction in noise arising from resonance.

By contrast, during the intake stroke, the compression stroke, and the exhaust stroke, the lubricating oil films exist between the piston pin 2 and the inner surface of the pin insertion hole 10d of the connecting rod 10 and between the piston pin 2 and the inner surface of the pin support hole 1d of each boss portion 1c of the piston 1. This prevents resonance that occurs during the combustion stroke. If the small end part 10a of the connecting rod 10 is provided with the dynamic vibration absorbers 20, the resonance could be reduced during the combustion stroke, whereas during the intake stroke, the compression stroke, and the exhaust stroke during which resonance does not occur, the dynamic vibration absorbers 20 would vibrate. For this reason, during the intake stroke, the compression stroke, and the exhaust stroke, noise rather increases due to the vibrations of the dynamic vibration absorbers 20. However, since, in this embodiment, the piston pin 2 includes the dynamic vibration absorbers 20, the vibrations of the dynamic vibration absorbers 20 are not transferred through the lubricating oil film between the piston pin 2 and the inner surface of the pin insertion hole 10d of the connecting rod 10 (the spring through which the piston pin 2 and the small end part 10a of the connecting rod 10 are coupled together) to the connecting rod 10 during the intake stroke, the compression stroke, and the exhaust stroke, and noise does not increase due to the vibrations. The provision of the dynamic vibration absorbers 20 inside the piston pin 2 enables effective utilization of a space, and eliminates the need for increasing the size of the piston 1.

The present invention should not be limited to the foregoing embodiment, and various changes and modifications may be made without departing from the scope of the claims.

Figure 5:
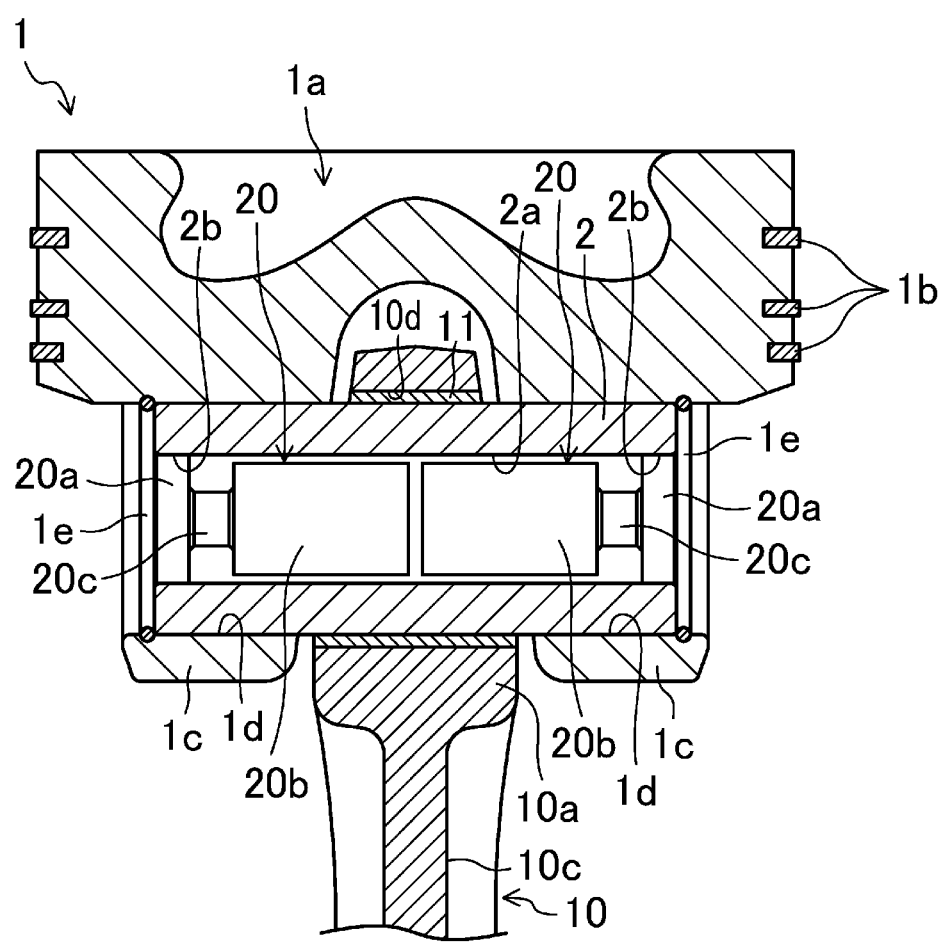
FIG. 5 illustrates example modified dynamic vibration absorbers, and corresponds to FIG. 3.

While, in the foregoing embodiment, the fixed portions 20a of the two dynamic vibration absorbers 20, for example, are formed in one piece, the fixed portions 20a of the two dynamic vibration absorbers 20 may be separately formed, and the two dynamic vibration absorbers 20 may be independent of each other. In this case, as in the foregoing embodiment, the two dynamic vibration absorbers 20 may be provided inside the piston pin 2 such that the fixed portions 20a are closer to the middle of the piston pin 2 in the direction along the central axis thereof than the movable portions 20b. Alternatively, as illustrated in FIG. 5, the two dynamic vibration absorbers 20 may be provided inside the piston pin 2 such that the movable portions 20b are closer to the middle of the piston pin 2 in the direction along the central axis thereof than the fixed portions 20a. In either case, the two dynamic vibration absorbers 20 are located at both sides of the plane that passes through the middle of the piston pin 2 in the direction along the central axis thereof and is perpendicular to the central axis of the piston pin 2. The movable portions 20b of the two dynamic vibration absorbers 20 have substantially the same mass. The centers of gravity of the movable portions 20b of the two dynamic vibration absorbers 20 are located on the central axis of the piston pin 2, and the movable portions 20b of the two dynamic vibration absorbers 20 are symmetrically located with respect to the plane that passes through the middle of the piston pin 2 in the direction along the central axis thereof and is perpendicular to the central axis of the piston pin 2.

In FIG. 5, both end portions of the inner circumferential surface of the through hole 2a of the piston pin 2 in the direction along the central axis of the piston pin 2 are each provided with the press-fit portion 2b. The inside diameter of each press-fit portion 2b of the inner surface of the through hole 2a is equal to that of another portion of the through hole 2a. The fixed portions 20a of the two dynamic vibration absorbers 20 are each press-fitted into the corresponding one of the press-fit portions 2b so as to be fixed. As such, the fixed portions 20a are fixed to overlap portions of the piston pin 2 supported by the boss portions 1c of the piston 1 (the pin support hole 1d) in the direction along the central axis of the piston pin 2. This can more effectively reduce the resonance of the piston 1, the piston pin 2, and the small end part 10a of the connecting rod 10 in combination with respect to the large end part 10b of the connecting rod 10 during the combustion stroke.

In the foregoing embodiment, the fixed portions 20a of the two dynamic vibration absorbers 20 are each press-fitted into the corresponding one of the press-fit portions 2b of the inner surface of the through hole 2a of the piston pin 2 so as to be fixed. Alternatively, the positioning of the fixed portions 20a (especially in the direction along the central axis of the piston pin 2) as described below may further ensure the positioning and fixing of the fixed portions 20a on the piston pin 2 to further ensure that the dynamic vibration absorbers 20 function to reduce the resonance.

Figure 6:
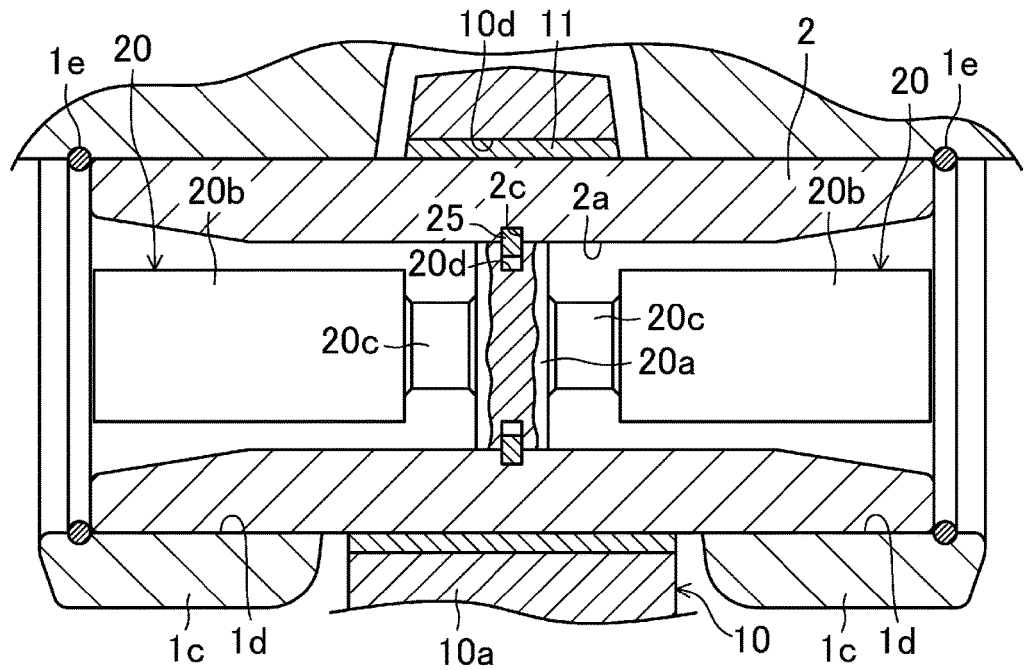
FIG. 6 is an enlarged view of a principal portion of the piston including other example modified dynamic vibration absorbers.

Specifically, for example, as illustrated in FIG. 6, the integral fixed portions 20a of the two dynamic vibration absorbers 20 in the foregoing embodiment (a middle portion of a substantially single member corresponding to the fixed portions 20a in the direction along the central axis of the piston pin 2) has a groove 20d. A C-shaped clip 25 is fitted into the groove 20d. Meanwhile, a portion of the inner surface of the through hole 2a of the piston pin 2 corresponding to the groove 20d has a groove 2c. When the dynamic vibration absorbers 20 to which the C-shaped clip 25 is fitted is inserted through one of openings of the through hole 2a into the through hole 2a, the C-shaped clip 25 has a smaller diameter under conditions where the C-shaped clip 25 is in contact with a portion of the inner surface that does not include the groove 2c, whereas the C-shaped clip 25 has a larger diameter when facing the groove 2c, and is fitted into the groove 2c. This allows the fixed portions 20a to be positioned on the piston pin 2 and to be fixed thereon.

Figure 7:
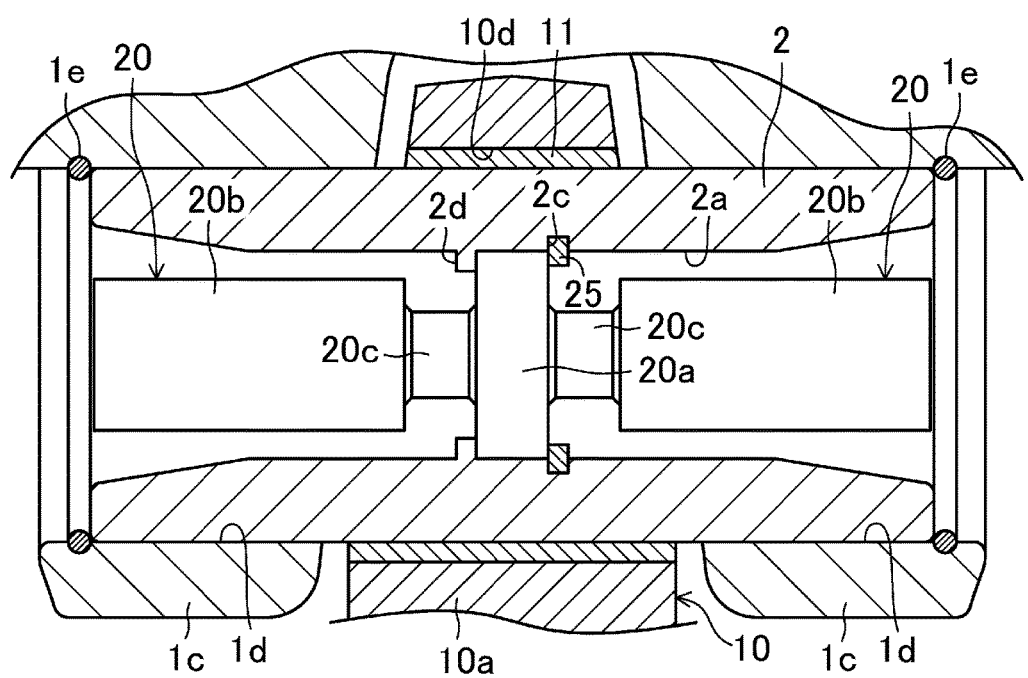
FIG. 7 is an enlarged view of a principal portion of the piston including still other example modified dynamic vibration absorbers.

Alternatively, for example, as illustrated in FIG. 7, the inner surface of the through hole 2a of the piston pin 2 is provided with a stopper 2d and a groove 2c. The stopper 2d abuts against one of the surfaces of the integral fixed portions 20a in the direction along the central axis of the piston pin 2 (the left surface of the integral fixed portions 20 in FIG. 7). The C-shaped clip 25 abuts against the other one of the surfaces of the integral fixed portions 20a in the direction (the right surface thereof in FIG. 7), and is fitted into the groove 2c. The dynamic vibration absorbers 20 are inserted through the right opening of the through hole 2a in FIG. 7 into the through hole 2a without fitting the C-shaped clip 25 into the groove 2c, and the one of the surfaces of the integral fixed portions 20a in the direction is brought into contact with the stopper 2d. Subsequently, the C-shaped clip 25 is inserted through the opening of the through hole 2a into the through hole 2a with a fixture, and is fitted into the groove 2c. Thus, the stopper 2d and the C-shaped clip 25 allows the fixed portions 20a to be positioned on the piston pin 2 and to be fixed thereon.

Examples of processes for fixing the fixed portions 20a on the piston pin 2 may include brazing and electric resistance welding in addition to the press-fitting and a process in which the C-shaped clip 25 is used.

While, in the foregoing embodiment, the full floating piston pin 2 is used, the piston pin 2 should not be limited to the full floating piston pin. A semi-floating piston pin 2 may be used. The semi-floating piston pin 2 is rotatable with respect to the pin insertion hole 10d of the connecting rod 10, and is fixed to the inner surfaces of the pin support holes 1d in the boss portions 1c of the piston 1.

The example embodiment described above is provided by way of illustration only and should not be construed to limit the invention. The scope of the invention should be measured solely by reference to the claims. All the modifications and changes within an equivalent scope of the claims fall within the scope of the invention.

Figure 8:
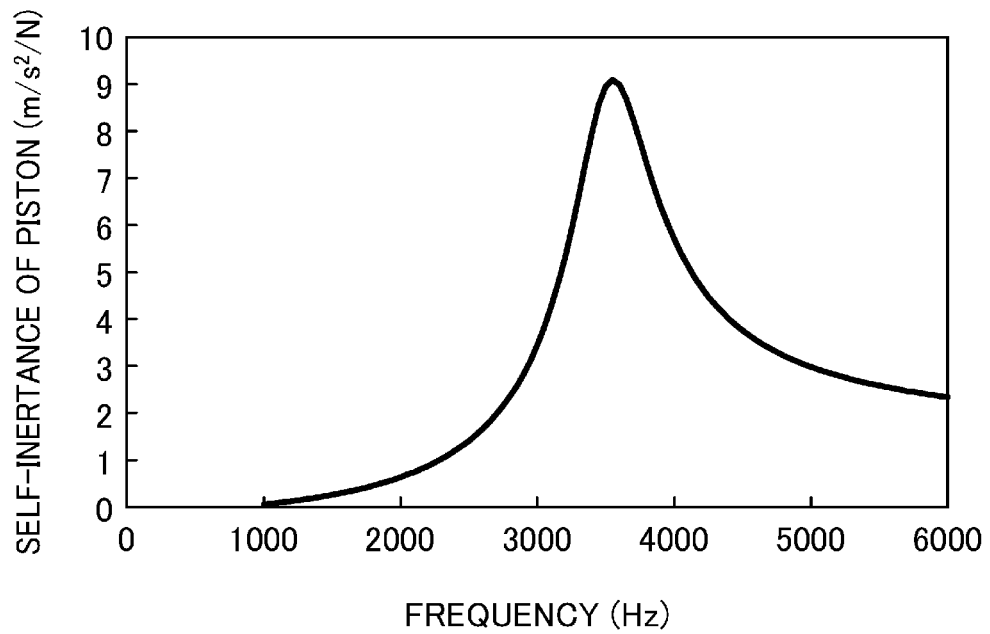
FIG. 8 is a graph illustrating the self-inertance frequency response of the piston that does not include a dynamic vibration absorber during a combustion stroke.

Here, two dynamic vibration absorbers similar in configuration to those of the foregoing embodiment were provided inside a piston pin 2 through which a piston of an engine and a connecting rod are coupled together and which has a hollow cross section, and a test was conducted to examine the effectiveness of the dynamic vibration absorbers reducing resonance. In the engine, the frequency response of the self-inertance of the piston that does not include dynamic vibration absorbers during the combustion stroke (the acceleration of vibrations of the piston to which a load of 1 N is applied) is illustrated in FIG. 8, and the resonant frequency is about 3500 Hz.

While the masses m of movable portions of the two dynamic vibration absorbers were equal to each other, the mass m of each movable portion was varied among 0.005 kg, 0.01 kg, 0.025 kg, 0.05 kg, and 0.1 kg. When the movable portions had each mass, the self-inertance frequency response of the piston was examined. In this examination, while the two dynamic vibration absorbers had the same spring constant k, the value k increased with increasing mass m. Here, the value k/m increases with increasing mass m.

Figure 9:
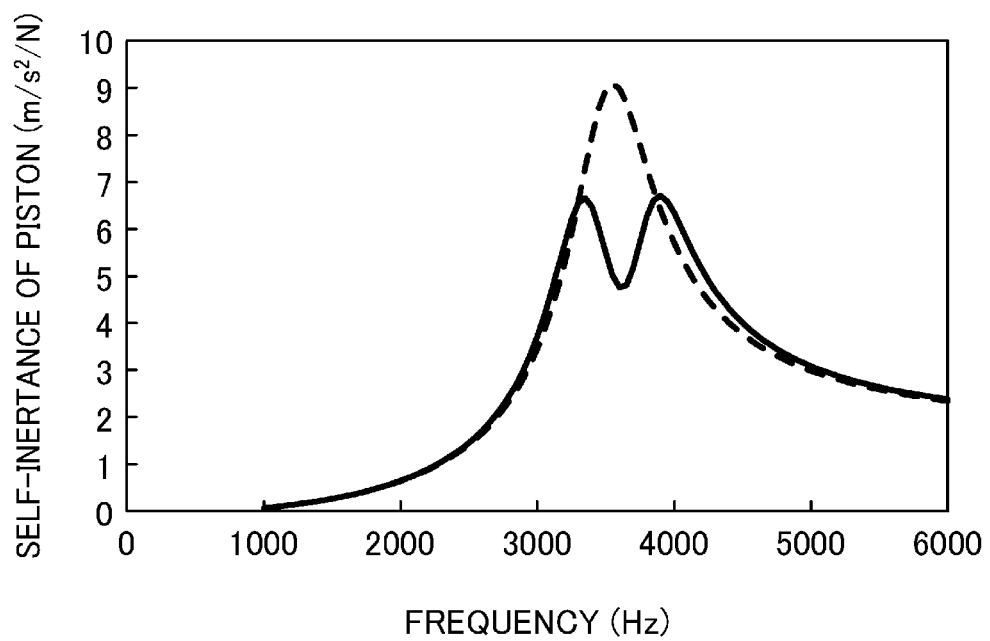
FIG. 9 is a graph illustrating the self-inertance frequency response of the piston including dynamic vibration absorbers during the combustion stroke, where a movable portion of each dynamic vibration absorber has a mass of 0.005 kg.
Figure 10:
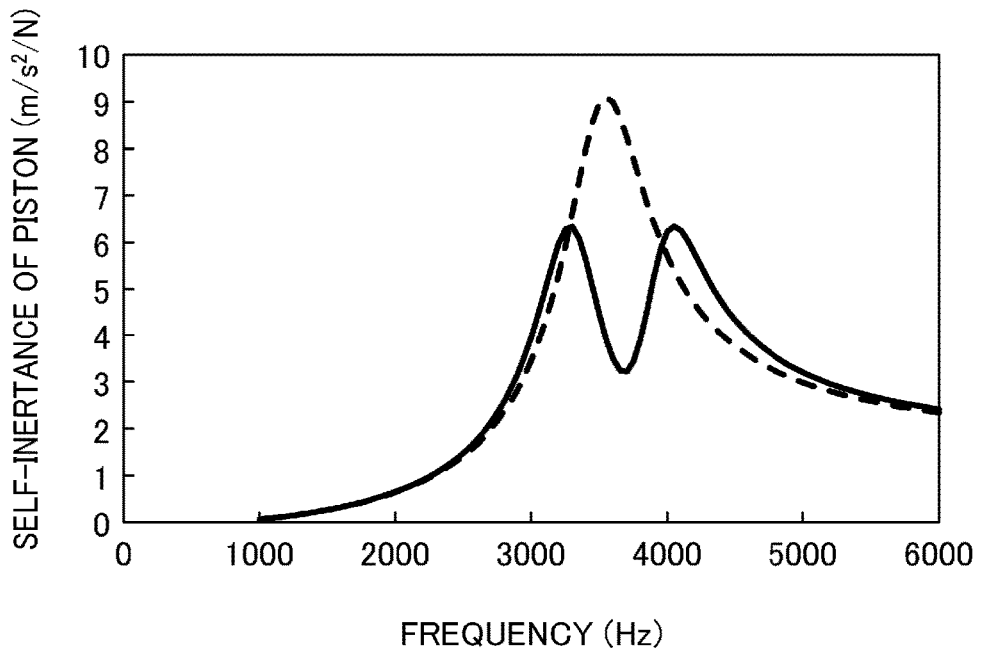
FIG. 10 is a graph illustrating the self-inertance frequency response of the piston including dynamic vibration absorbers during the combustion stroke, where a movable portion of each dynamic vibration absorber has a mass of 0.01 kg.
Figure 11:
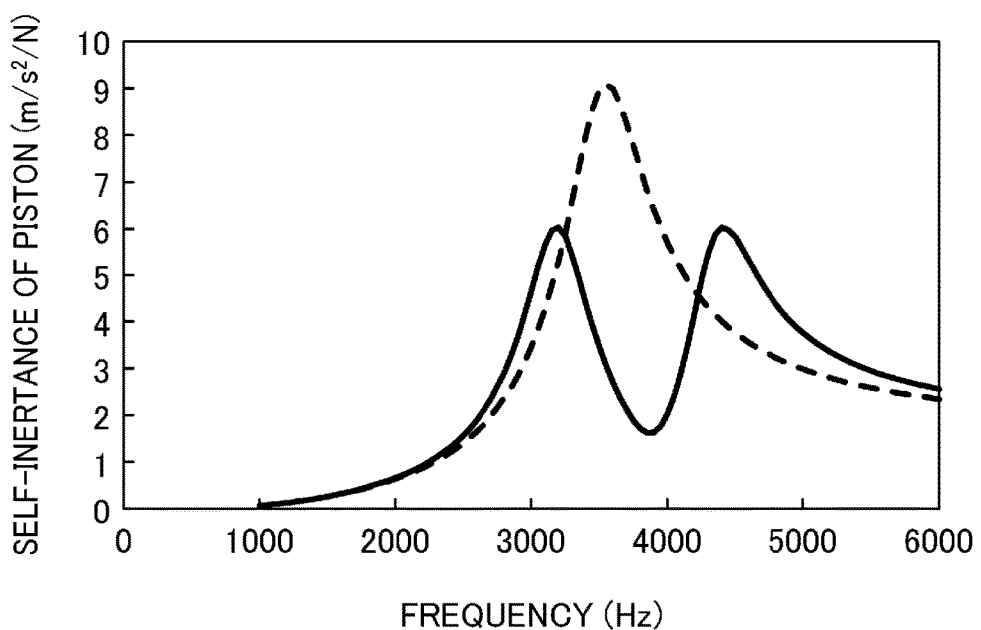
FIG. 11 is a graph illustrating the self-inertance frequency response of the piston including dynamic vibration absorbers during the combustion stroke, where a movable portion of each dynamic vibration absorber has a mass of 0.025 kg.
Figure 12:
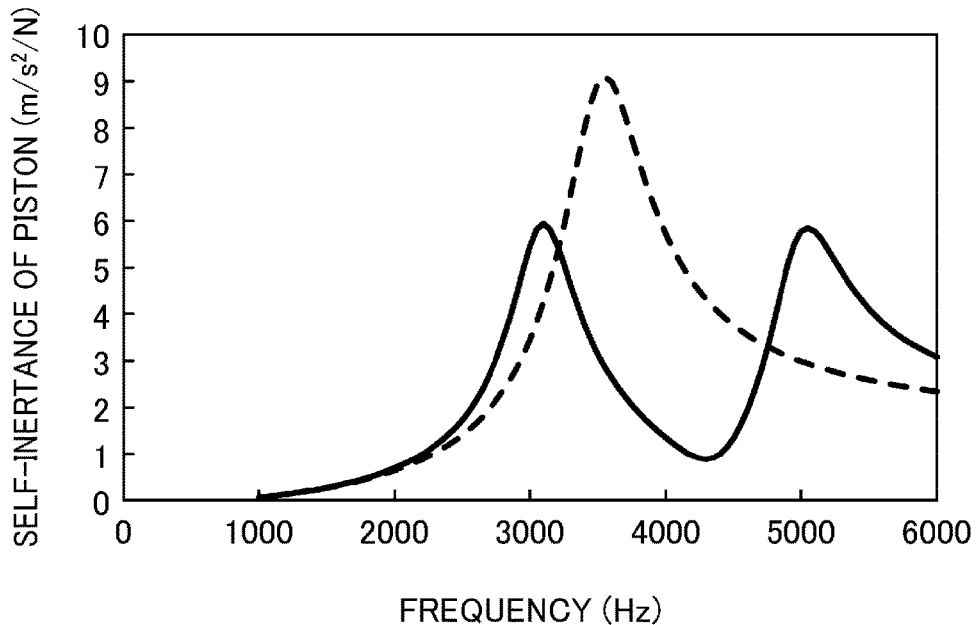
FIG. 12 is a graph illustrating the self-inertance frequency response of the piston including dynamic vibration absorbers during the combustion stroke, where a movable portion of each dynamic vibration absorber has a mass of 0.05 kg.
Figure 13:
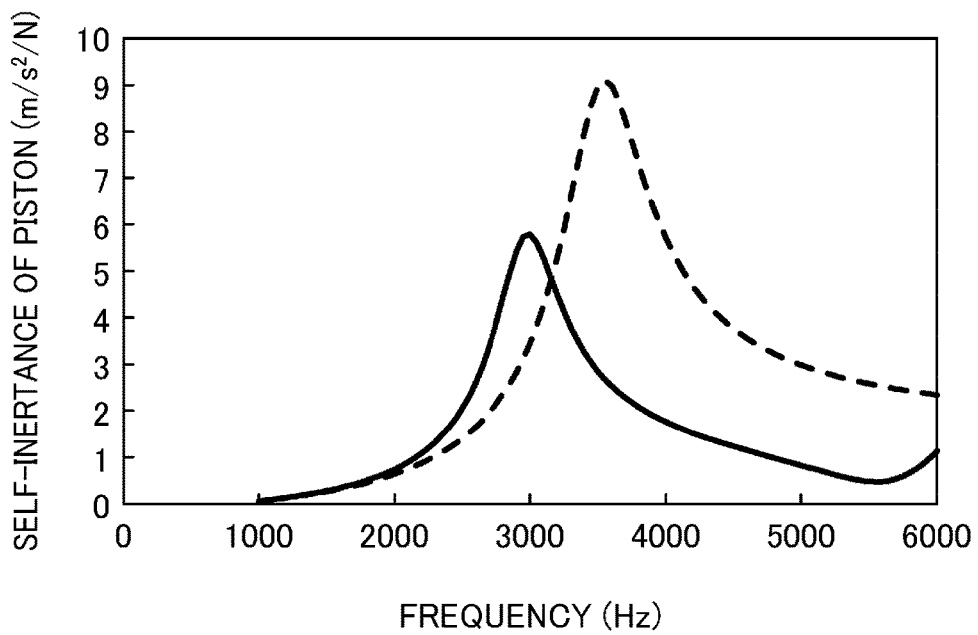
FIG. 13 is a graph illustrating the self-inertance frequency response of the piston including dynamic vibration absorbers during the combustion stroke, where a movable portion of each dynamic vibration absorber has a mass of 0.1 kg.
Figure 14:
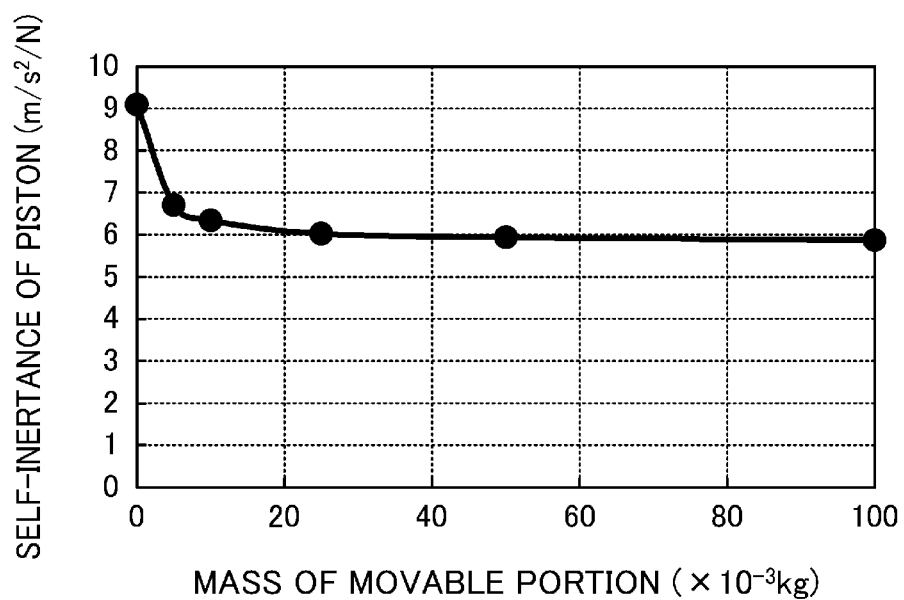
FIG. 14 is a graph illustrating the relationship between the mass of the movable portion and the maximum self-inertance of the piston.

The test results are illustrated in FIGS. 9-13. FIG. 9 illustrates the self-inertance frequency response of the piston during the combustion stroke when the movable portion of each dynamic vibration absorber has a mass of 0.005 kg. FIG. 10 illustrates the self-inertance frequency response of the piston during the combustion stroke when the movable portion of each dynamic vibration absorber has a mass of 0.01 kg. FIG. 11 illustrates the self-inertance frequency response of the piston during the combustion stroke when the movable portion of each dynamic vibration absorber has a mass of 0.025 kg. FIG. 12 illustrates the self-inertance frequency response of the piston during the combustion stroke when the movable portion of each dynamic vibration absorber has a mass of 0.05 kg. FIG. 13 illustrates the self-inertance frequency response of the piston during the combustion stroke when the movable portion of each dynamic vibration absorber has a mass of 0.1 kg. The graph indicated by the broken line in each of FIGS. 9-13 corresponds to the graph illustrated in FIG. 8 where no dynamic vibration absorber is provided. FIG. 14 illustrates the relationship between the mass of each movable portion and the maximum self-inertance of the piston. When no dynamic vibration absorber is provided as illustrated in FIG. 8, the mass of each movable portion is zero.

FIGS. 8-14 show that if the mass of each movable portion is greater than or equal to a predetermined value (in the test, for example, 0.025 kg), the maximum self-inertance of the piston is stably kept low, and the resonance can be adequately reduced. Specifically, each movable portion may have any mass as long as a spring constant suitable for the mass can be determined. However, if each movable portion has a mass less than the predetermined value, the resonance may be inadequately reduced under the influence of manufacturing errors in dynamic vibration absorbers. Thus, to be less susceptible to the manufacturing errors in dynamic vibration absorbers, the mass of each movable portion is preferably greater than or equal to the predetermined value. If each movable portion has an excessively high mass, the dynamic vibration absorbers are difficult to provide inside the piston pin 2. Thus, the mass of each movable portion is more preferably close to the predetermined value.

Next, two dynamic vibration absorbers are configured to have different spring constants. The spring constant of one of the dynamic vibration absorbers is equal to that of each dynamic vibration absorber used in the test and including the movable portion having a mass of 0.025 kg, and the spring constant of the other one of the dynamic vibration absorbers is C times as high as that of the one of the dynamic vibration absorbers. A movable portion of the other one of the dynamic vibration absorbers has a mass of 0.025 kg, which is equal to the mass of the movable portion of the one of the dynamic vibration absorbers. The ratio C of the spring constant of the other one of the dynamic vibration absorbers to that of the one of the dynamic vibration absorbers was varied from 1.2 to 2.0 in steps of 0.1. When the ratio C is each value from 1.2 to 2.0 in steps of 0.1, the self-inertance frequency response of the piston during the combustion stroke was examined.

Figure 15:
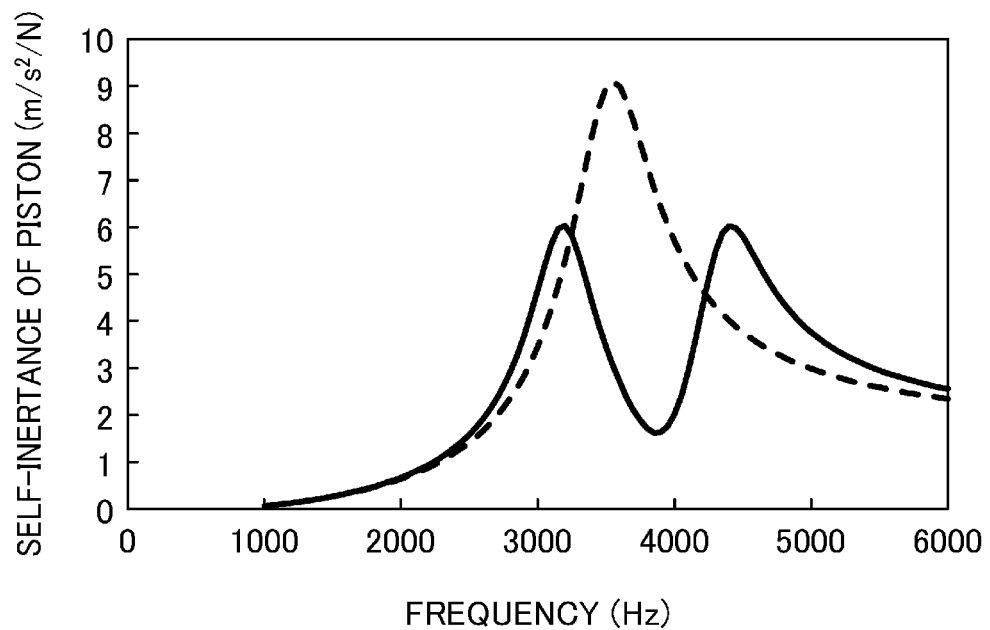
FIG. 15 is a graph illustrating the self-inertance frequency response of the piston during the combustion stroke, where the ratio C of the spring constant of one of dynamic vibration absorbers to that of the other one thereof is 1.0.
Figure 16:
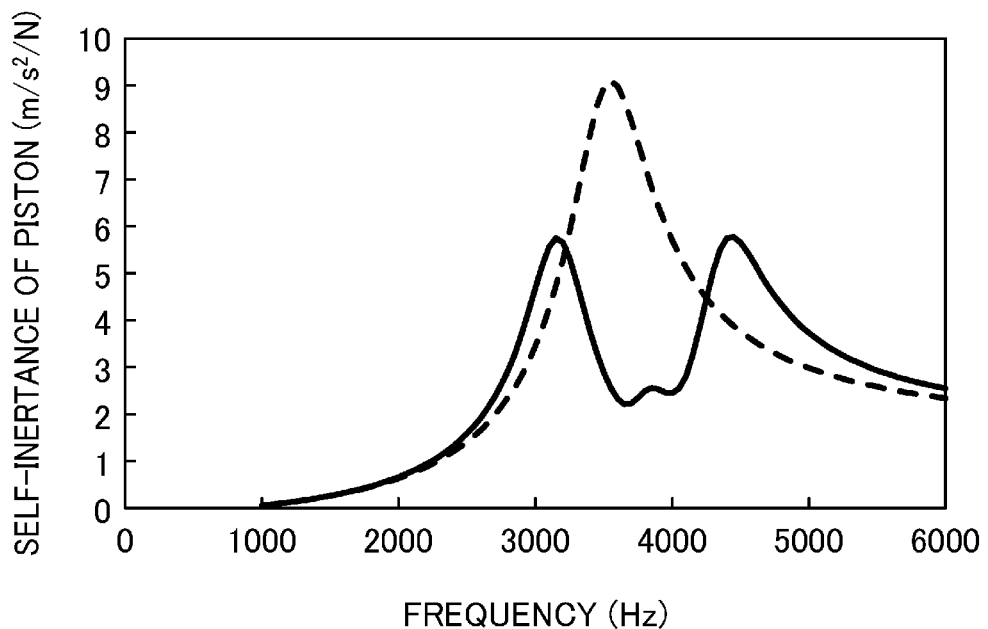
FIG. 16 is a graph illustrating the self-inertance frequency response of the piston during the combustion stroke, where the ratio C of the spring constant of the one of the dynamic vibration absorbers to that of the other one thereof is 1.2.
Figure 17:
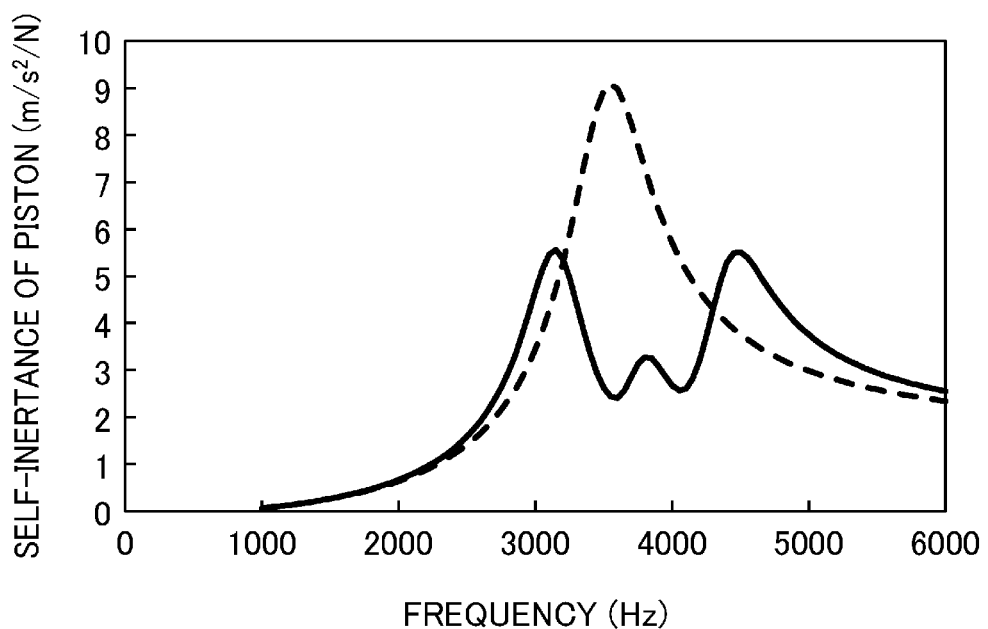
FIG. 17 is a graph illustrating the self-inertance frequency response of the piston during the combustion stroke, where the ratio C of the spring constant of the one of the dynamic vibration absorbers to that of the other one thereof is 1.3.
Figure 18:
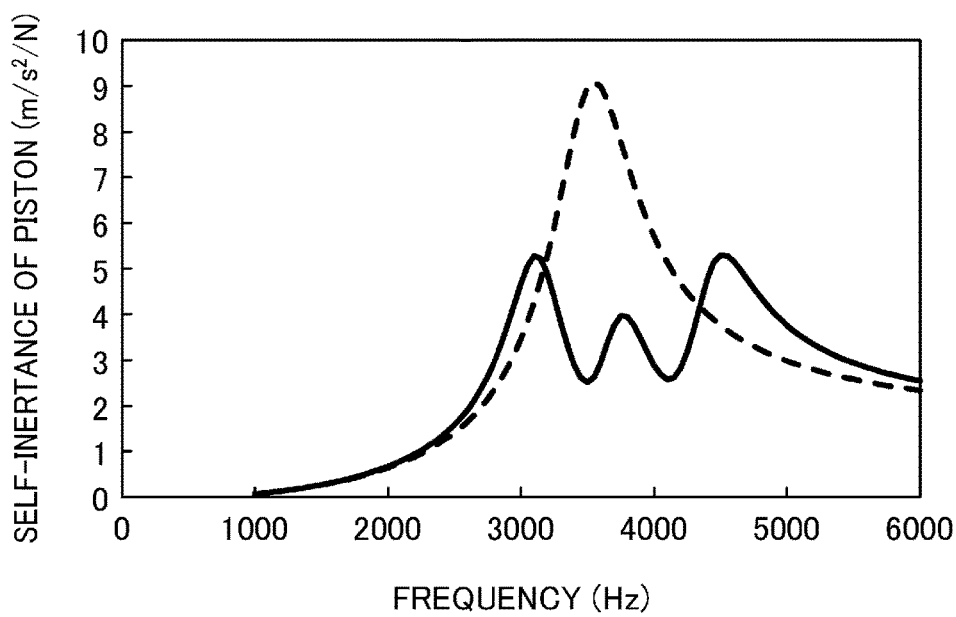
FIG. 18 is a graph illustrating the self-inertance frequency response of the piston during the combustion stroke, where the ratio C of the spring constant of the one of the dynamic vibration absorbers to that of the other one thereof is 1.4.
Figure 19:
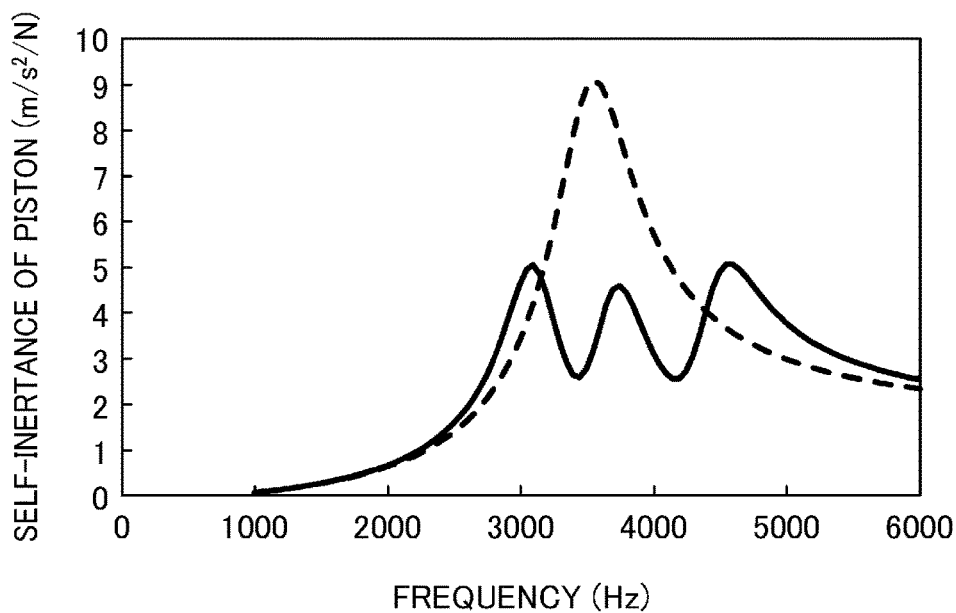
FIG. 19 is a graph illustrating the self-inertance frequency response of the piston during the combustion stroke, where the ratio C of the spring constant of the one of the dynamic vibration absorbers to that of the other one thereof is 1.5.
Figure 20:
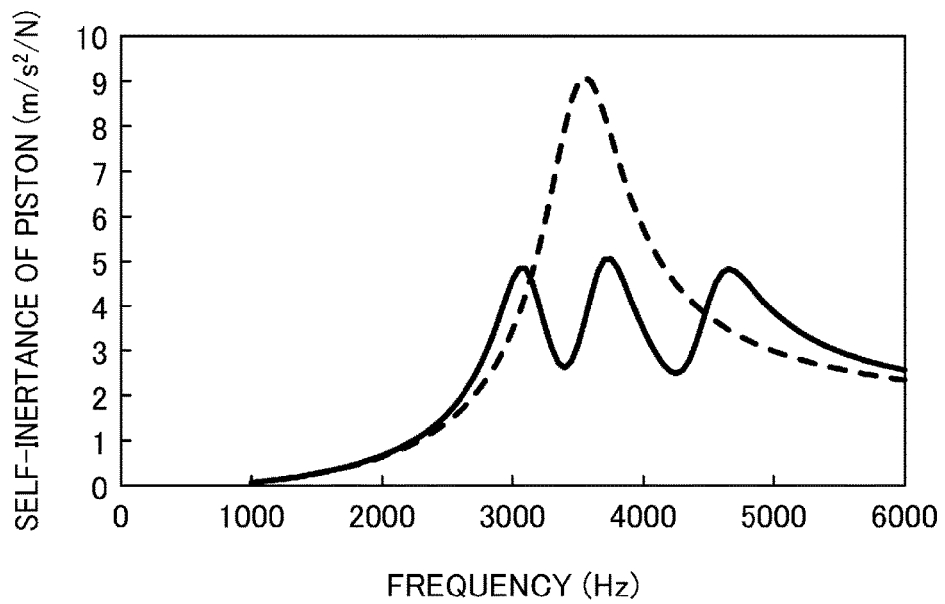
FIG. 20 is a graph illustrating the self-inertance frequency response of the piston during the combustion stroke, where the ratio C of the spring constant of the one of the dynamic vibration absorbers to that of the other one thereof is 1.6.
Figure 21:
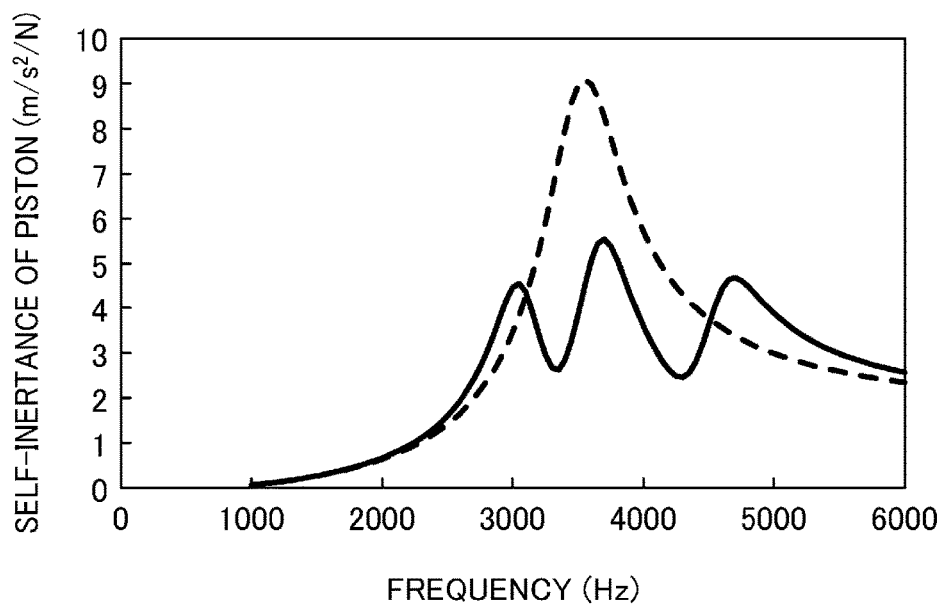
FIG. 21 is a graph illustrating the self-inertance frequency response of the piston during the combustion stroke, where the ratio C of the spring constant of the one of the dynamic vibration absorbers to that of the other one thereof is 1.7.
Figure 22:
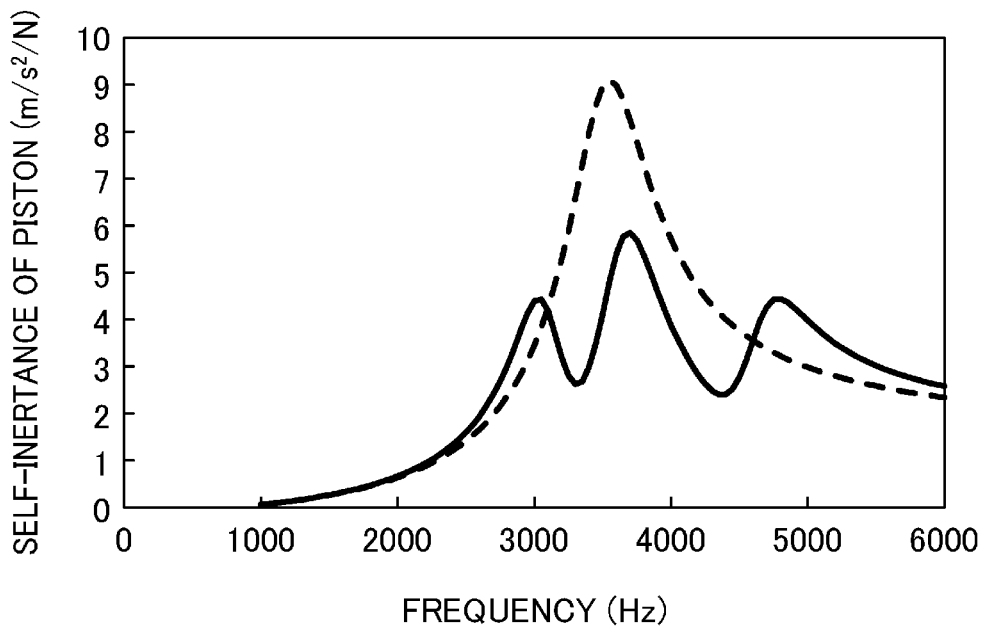
FIG. 22 is a graph illustrating the self-inertance frequency response of the piston during the combustion stroke, where the ratio C of the spring constant of the one of the dynamic vibration absorbers to that of the other one thereof is 1.8.
Figure 23:
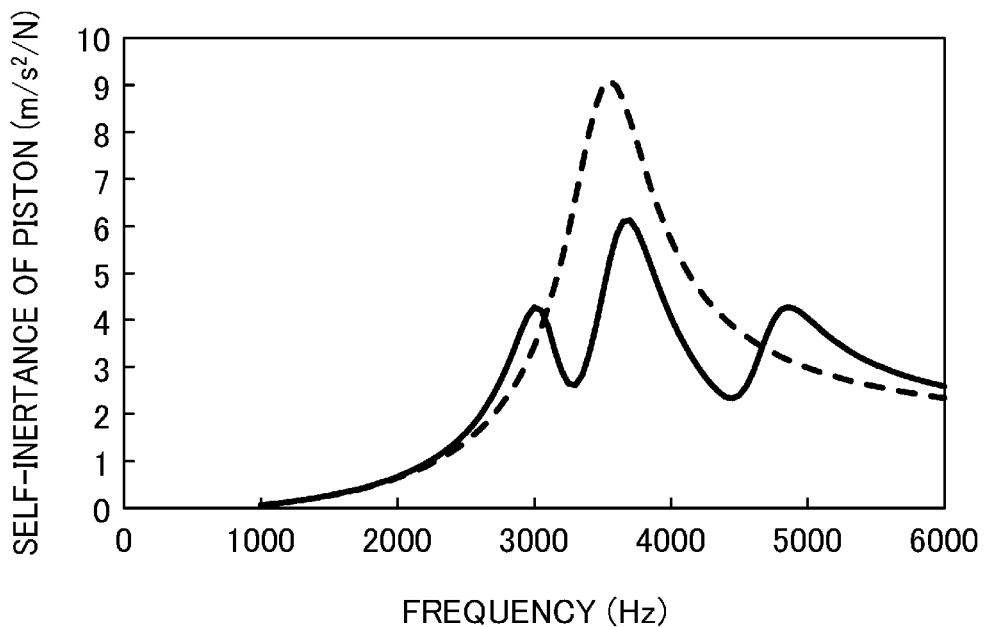
FIG. 23 is a graph illustrating the self-inertance frequency response of the piston during the combustion stroke, where the ratio C of the spring constant of the one of the dynamic vibration absorbers to that of the other one thereof is 1.9.
Figure 24:
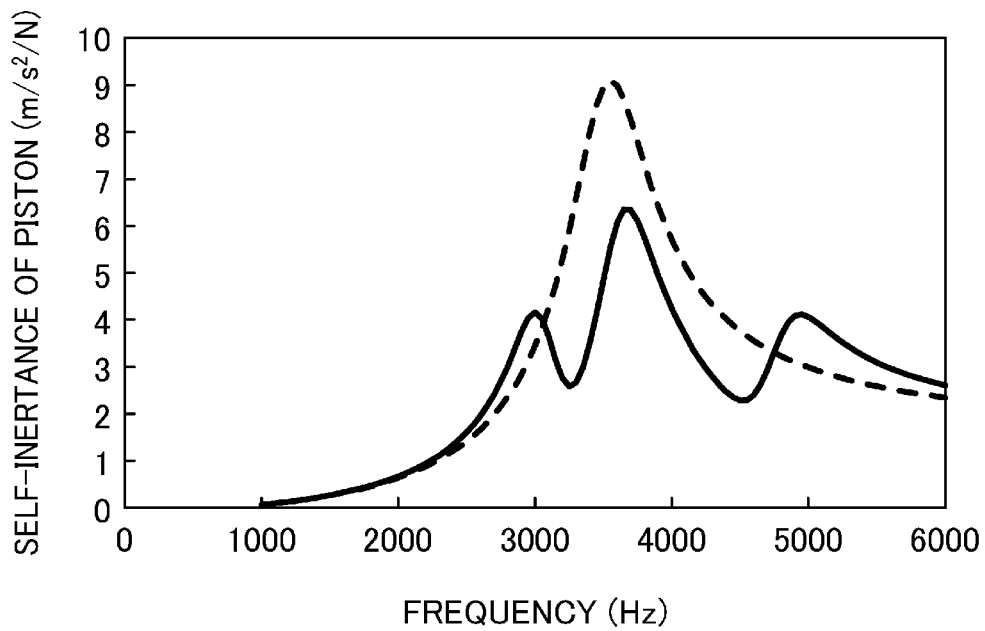
FIG. 24 is a graph illustrating the self-inertance frequency response of the piston during the combustion stroke, where the ratio C of the spring constant of the one of the dynamic vibration absorbers to that of the other one thereof is 2.0.
Figure 25:
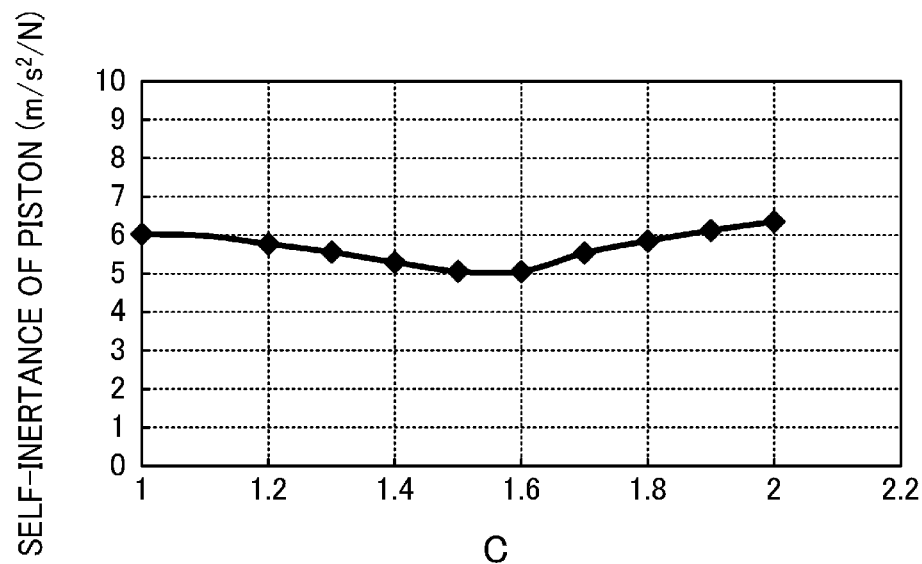
FIG. 25 is a graph illustrating the relationship between the ratio C of the spring constant of the one of the dynamic vibration absorbers to that of the other one thereof and the maximum self-inertance of the piston.

The examination results are illustrated in FIGS. 16-24. FIG. 15 illustrates the frequency response when the ratio C is equal to 1.0, and FIG. 15 is identical to FIG. 11. FIG. 16 illustrates the frequency response when the ratio C is 1.2. FIG. 17 illustrates the frequency response when the ratio C is 1.3. FIG. 18 illustrates the frequency response when the ratio C is 1.4. FIG. 19 illustrates the frequency response when the ratio C is 1.5. FIG. 20 illustrates the frequency response when the ratio C is 1.6. FIG. 21 illustrates the frequency response when the ratio C is 1.7. FIG. 22 illustrates the frequency response when the ratio C is 1.8. FIG. 23 illustrates the frequency response when the ratio C is 1.9. FIG. 24 illustrates the frequency response when the ratio C is 2.0. The graph indicated by the broken line in each of FIGS. 15-24 corresponds to the graph illustrated in FIG. 8 where no dynamic vibration absorber is provided. FIG. 25 illustrates the relationship between the ratio C and the maximum self-inertance of the piston.

FIGS. 15-24 show that increasing the ratio C can reduce vibrations in a wider frequency range (including the resonant frequency) than in the case where the two dynamic vibration absorbers have the same spring constant. However, FIGS. 15-25 show that if the ratio C is excessively high, vibrations at the resonant frequency are less effectively reduced. For this reason, the ratio C is preferably within a predetermined range (e.g., 1.3-1.7) where while vibrations at the resonant frequency are significantly reduced, vibrations in a frequency range as wide as possible can be reduced. Outside the frequency range where the amplitude of vibrations is less than when no dynamic vibration absorber is provided (the graph indicated by the broken line), the amplitude of vibrations are greater than when no dynamic vibration absorber is provided. However, vibrations outside the frequency range are considerably low in frequency, and the resultant noise is thus negligible.

If such two dynamic vibration absorbers are configured to have different spring constants, vibrations in a relatively wide frequency range including the resonant frequency can be reduced. This enables an adequate reduction in resonance even in a situation where the size of each movable portion is limited and each movable portion cannot have a mass greater than or equal to the predetermined value.

INDUSTRIAL APPLICABILITY

The present invention is useful for an engine piston structure in which a piston and a small end part of a connecting rod are coupled together through a piston pin.

DESCRIPTION OF REFERENCE CHARACTERS

1 Piston
2 Piston Pin
10 Connecting Rod
10a Small End Part
10b Large End Part
20 Dynamic Vibration Absorber
20a Fixed Portion
20b Movable Portion
20c Supporting Portion

The invention claimed is:

1. An engine piston structure, comprising:
    a piston configured to reciprocate in a cylinder;
    a connecting rod having a small end part coupled to the piston, and having a large end part coupled to a crankshaft;
    a piston pin through which the piston and the small end part of the connecting rod are coupled together and which has a hollow cross section; and
    at least one dynamic vibration absorber provided inside the piston pin to reduce resonance of the piston, the piston pin, and the small end part of the connecting rod in combination with respect to the large end part of the connecting rod during a combustion stroke.

2. The engine piston structure of claim 1, wherein
    the at least one dynamic vibration absorber comprises two dynamic vibration absorbers provided inside the piston pin,
    each dynamic vibration absorber has
        a fixed portion fixed to the piston pin,
        a movable portion extending inside the piston pin in a direction along a central axis of the piston pin, and
        a supporting portion supporting the movable portion such that the movable portion is capable of vibrating with respect to the fixed portion along a diameter of the piston pin,
    an outside diameter of the movable portion is determined such that if the movable portion vibrates, the movable portion would not be in contact with an inner surface of the piston pin, and
    the two dynamic vibration absorbers are located at both sides of a plane that passes through a middle of the piston pin in the direction along the central axis of the piston pin and is perpendicular to the central axis of the piston pin.

3. The engine piston structure of claim 2, wherein
    masses of the movable portions of the two dynamic vibration absorbers are substantially equal to each other, and
    the two dynamic vibration absorbers have different spring constants.

* * * * *